United States Patent [19]
Deplante

[11] 3,729,154
[45] Apr. 24, 1973

[54] METHOD AND DEVICE RELATED TO THE EJECTION OF A PERSON FROM AN AIRCRAFT COCKPIT OR THE LIKE

[75] Inventor: Henri Deplante, Paris, France

[73] Assignee: Avions Marcel Dassault, Vaucresson, France

[22] Filed: Feb. 17, 1971

[21] Appl. No.: 115,956

[30] Foreign Application Priority Data

Feb. 18, 1970 France..................7005804

[52] U.S. Cl.............244/122 AF, 102/49.5, 49/141
[51] Int. Cl..............................B64c 1/32
[58] Field of Search .........244/122 AF, 122 AE, 244/122 A, 121; 102/49.5, 23; 49/141

[56] References Cited

UNITED STATES PATENTS 3,561,703  2/1971  Stencel..................244/122 AF
3,185,090  5/1965  Weber.....................102/49.5 X
2,609,750  9/1952  McFarland..................102/23

FOREIGN PATENTS OR APPLICATIONS 698,226  10/1953  Great Britain................49/141

Primary Examiner—Milton Buchler
Assistant Examiner—Galen L. Barefoot
Attorney—William J. Daniel

[57] ABSTRACT

A method and device related to the ejection of a person from an aircraft cockpit or the like, wherein two sets of detonating charges in appropriate spaced relationship act on the confining wall, the first set to cause the commencement of ruptures and the second set, which are fired subsequently, to cause completion of the previously commenced ruptures, thereby to permit ejection of the person through the shattered and fragile wall, while the latter is nevertheless still intact, without danger.

10 Claims, 4 Drawing Figures

Patented April 24, 1973  3,729,154

METHOD AND DEVICE RELATED TO THE EJECTION OF A PERSON FROM AN AIRCRAFT COCKPIT OR THE LIKE

This invention relates to a method and device for passing a human being substantially without injury through the wall of an aircraft cockpit or the like. The invention relates more particularly, in its most interesting application, to the transparent wall of the cockpit of an aircraft which represents an obstacle to the ejection of the pilot in the case of danger.

It is known that devices making possible such ejection have been in existence for a fairly long time, and initially comprised, in aircraft, in the upper part of the cockpit, a transparent cover which was disconnected to permit the subsequent ejection of the pilot. However, in modern aircraft which fly at speeds exceeding the speed of sound, this operation takes too much time or, in other words, the aircraft travels through a path which is too long during the execution of this operation, so that one has to use a more expedient method : the transparent panel is fractured along a predetermined line by means of a detonating thread which is fired just before the actuation of the ejector for the pilot, who is normally fastened to his seat.

In principle, since the pilot and his seat part after the rupture of the carapace, the movement takes place freely. In fact, however, grave accidents can occur. Once the fracture of the carapace has been effected, the seat is ejected with the pilot immediately after the fracture. The pilot and the part of the carapace are then located in the flow of air where vortices create the danger of a collision between the pilot and the carapace and, in view of the large dimension of the carapace, the shock may have very grave consequences for the pilot.

The invention has the object to ensure the safety of the pilot by means of a device which comprises an assembly of explosive elements acting on the carapace and adapted to ensure that the carapace is rendered fragile before the ejection of the pilot.

This means that at the moment of the ejection, the carapace must be regarded as still in place when the seat of the pilot impinges thereon (the departure of the seat and the fragilization of the carapace take place practically together). The carapace is now in the form of comparatively small pieces having a relatively small velocity, and contact with these pieces does not represent any danger.

Hence, the method according to the invention, which permits the ejection of a person through the wall of a cockpit or the like, practically without injury, consists in that prior to the actual ejection, the carapace is subjected to the action of a series of explosive charges which are so calculated and distributed that they produce a series of ruptures in the material of the wall, without, however, causing its perforation, so that the wall in its entirety may be regarded as still being in position during the ejection, having regard to the rapidity of the successive operations.

Preferably, the device according to the invention, adapted to produce the ejection of the pilot of an aircraft, comprises a first series of explosive charges acting on the carapace and arranged along a contour which preferably follows the edge of the carapace in contact with the fuselage, and at least one second series of explosive charges acting on the carapace preferably positioned in alternate aligned or staggered arrangement to the first series and in predetermined spacing therewith, and means for exploding automatically and successively the first and the second series of charges prior to the ejection of the pilot, wherein the charges of the first series are adapted to produce in the carapace only the commencement of ruptures, and those of the second series adapted to propagate the break lines and complete the previously started fragmentation, the arrangement being such that the first and the second explosions present no danger for the pilot. In practice, if the charges of explosive for both series are of the same power and of the same nature, the result is satisfactory.

The invention will be further described by way of example with reference to the accompanying drawings in which.

Figure 1:
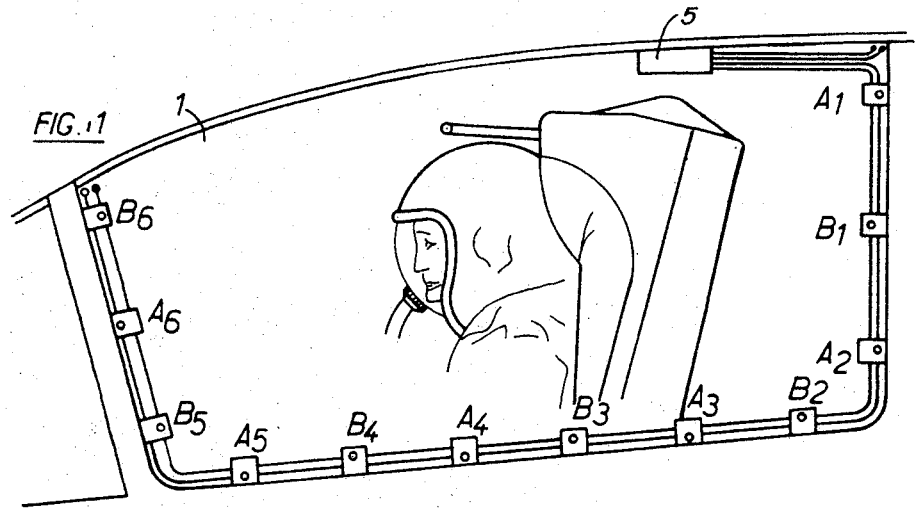
FIG. 1 shows in elevation a cockpit equipped according to the invention.

The cockpit shown in the drawing comprises, as known, a carapace 1 of thick plexiglass. On the edge of the carapace where it meets the frame are provided two rows of detonators, shown respectively at $A_1$, $A_2$, $A_3$, etc., and $B_1$, $B_2$, $B_3$, etc., the individual detonators of these rows being arranged in alternation. Each detonator comprises an explosive charge in a shell casing which rests on the carapace 1. The invention may be used with any type of detonator distributed in this manner, and for any position of these detonators. Every detonating charge of the first series preferably has the power necessary to start a fracture with reliability (this power is a function of the resistance of the glass and is easily found by tests) without actually provoking a perforation of the glass of the carapace. The start of the rupture from each detonator $A_1$, $A_2$, etc. is effected in the shape of a star. The other detonators, $B_1$, $B_2$, etc. which have preferably the same structure and the same power, are preferably arranged halfway between the preceding detonators. They may alternatively be mounted slightly higher on the carapace, so that they form a staggered pattern. They have merely the task of shaking the carapace strongly so that the ruptures previously initiated extend and the total surface of the cockpit carapace becomes fragile. Then, the carapace comprises in fact only small pieces which are no longer coherent, and which do not represent a practical danger for the pilot. It is also possible to provide a third series of detonators but in practice two such series will invariably be sufficient ; the second series acts with a short delay of the order of a few milliseconds relative to the first series, and the whole is controlled in advance and automatically by the pilot when he starts his ejection.

Figure 2:
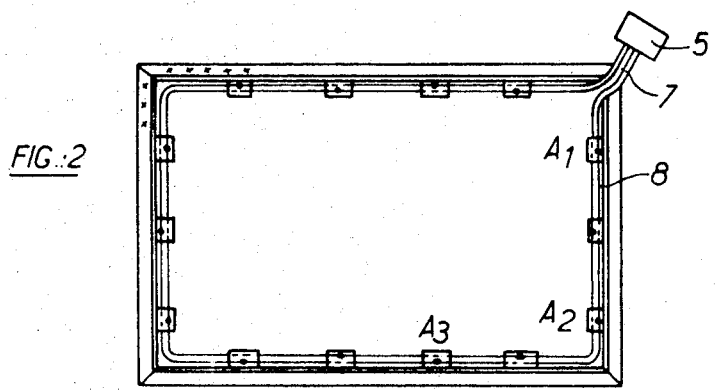
FIG. 2 is a plan view of the corresponding installation.

The detonators may be triggered off by electrical means using a source providing at least one pulse, including a suitable timing member, by any means known in conventional technology, or by pyrotechnical elements. This latter case is illustrated in FIG. 2, where reference numeral 5 indicates a pyrotechnical center point controlled by an electrical or a percussion detonator, and the explosion is propagated by transmission lines 7 and 8 to the two series of detonators; a special delaying element may or may not be included at the center point for the second series.

Figure 3:
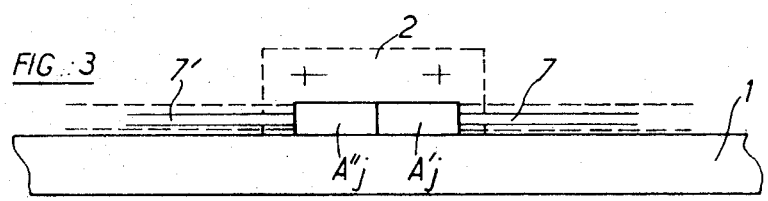
FIG. 3 shows a detonator with pyrotechnical starter.

FIG. 3 shows for this case the construction and the application of a detonating charge $A_j$ forming part of a series of detonators, for example $A_1$, $A_2$, etc. The detonator $A_j$ may be formed by two charges $A'_j$ and $A''_j$ placed end to end and held flat against the carapace by a support 2. The detonating transmission line arrives at 7 at $A'_j$ and leaves at 7' from $A''_j$. When the detonation arrives $A'_j$ explodes, the detonation passes to $A''_j$ which also explodes, and the explosion wave is propagated along 7'.

Figure 4:
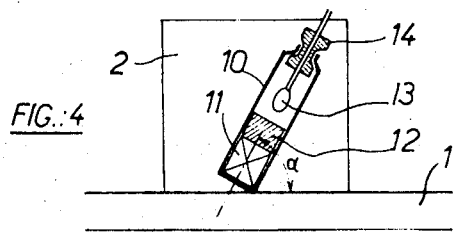
FIG. 4 shows a detonator with electrical starter.

If, on the other hand, the starting point is an electric pulse generator, the latter is directly connected by a network of wires to each of the detonators, which may have the construction shown in FIG. 4. A tube 10 of metal, the axis of which forms preferably an angle which is not zero with the surface of the carapace 1, contains the following:

at the bottom, a charge 11 of penthrite or hexogene;
above the same, a capsule 12 of nitride or lead trinitro resorcinate;
above the same, a pill 13 containing the electric wire heated to red heat by the passage of the electric pulse.

This detonator is closed by a plug 14 through which pass the electrical connections for the triggering off and is held by a support 2 shown diagrammatically.

Possibly the detonator may be mounted orthogonally on the carapace.

Moreover, the explosive charges may be used either by direct action on the carapace, or through a plate of suitable material such as a metal, e.g. lead, or through any device which makes it possible to produce a shock at the level of the carapace.

It should be noted that the device is normally constructed to operate with two series of detonators. In the rare case of one series of detonators malfunctioning, the fragmentation of the glass produced by the operation of a single series of detonators is sufficient to permit the passage of the ejector seat without serious danger for the pilot. The advantage of the double chain of detonators rests not only in the production of the good fragmentation of the carapace, but also in offering additional safety for the pilot.

It must be understood that the method and the device may be adapted to any moving or stationary device in which an escape path through a wall must be provided within a very short period.

It is also apparent that the invention is not limited to the embodiments described and illustrated hereinbefore, and that it comprises all modifications resulting from the substitution of technically equivalent elements, within the scope of the invention as defined by the appended claims.

I claim:

1. A method for ejecting a person from a confining space through a frangible confining wall comprising the steps of subjecting said wall to the action of a series of discrete localized explosive charges distributed at spaced intervals in a contour defining an egress opening in said wall, each of said charges having an intensity sufficient to crack the corresponding wall region without perforating the same, and thereafter ejecting said person through said cracked wall while the wall remains effectively intact in its ordinary position.

2. The method of claim 1 wherein said wall is first subjected to a series of said spaced charges of sufficient intensity to initiate said cracking and in closely spaced timed relation is then subjected to at least one other series of said charges arranged generally in alternation to said first series so as to propagate said cracking.

3. The method of claim 1 wherein said second step follows said first after a small predetermined time interval.

4. A device for ejecting a person from a confining space, through a frangible wall, said device comprising a first series of discrete explosive charges acting on the wall and arranged along at spaced intervals a curbed outline defining an egress opening and at least one other series of explosive charges located in spaced apart relationship from the first series of charges, the charges of the first series being sufficient to initiate cracking in the confining wall, and the charges of the second series sufficient to propagate the crack lines in order to complete fragmentation, neither series being sufficient to perforate said wall, and means for automatically detonating said two series of charges in close timed succession and means for thereafter ejecting said person through said cracked wall.

5. A device as in claim 4 wherein said frangible wall is the carapace of the cockpit of an aircraft, said outline of explosive charges follows the edge of the carapace which is in contact with the solid body of the fuselage, and the charges of the second series are placed in alternating relation to the first series of charges not outside the outline of the first series of charges.

6. A device according to claim 4 wherein said charges are detonated individually by electric circuits by means of a generator producing at least one electric pulse.

7. A device according to claim 4 wherein detonating of the charges of the two series is controlled by pyrotechnical means from a pyrotechnical starter.

8. A device according to claim 5 wherein each charge acts on the carapace through a plate of solid material or other intervening member.

9. A device according to claim 5 wherein said charges are applied flat to the carapace.

10. A device according to claim 5 wherein said detonating charges are set to act on the carapace at an angle greater than zero.

* * * * *